(12) United States Patent
Scott et al.

(10) Patent No.: US 8,032,620 B2
(45) Date of Patent: Oct. 4, 2011

(54) METHOD AND SYSTEM FOR IMPROVED IN-LINE MANAGEMENT OF AN INFORMATION TECHNOLOGY NETWORK

(76) Inventors: Marlin Scott, Mountain View, CA (US); Ron Britton, Brisbane, CA (US); Roger Hand, El Cerito, CA (US); Stephen Meyer, Menlo Park, CA (US)

( * ) Notice: Subject to any disclaimer, the term of this patent is extended or adjusted under 35 U.S.C. 154(b) by 891 days.

(21) Appl. No.: 10/876,360

(22) Filed: Jun. 24, 2004

(65) Prior Publication Data

US 2006/0015597 A1    Jan. 19, 2006

(51) Int. Cl.
 *G06F 15/173* (2006.01)
(52) U.S. Cl. .......................... 709/223; 709/224
(58) Field of Classification Search .................. 709/223, 709/224, 225, 226
See application file for complete search history.

(56) References Cited

U.S. PATENT DOCUMENTS

| | | | |
|---|---|---|---|
| 5,239,547 A * | 8/1993 | Tomiyama et al. | 714/26 |
| 5,460,441 A * | 10/1995 | Hastings et al. | 312/298 |
| 5,463,768 A * | 10/1995 | Cuddihy et al. | 714/37 |
| 5,742,762 A * | 4/1998 | Scholl et al. | 709/200 |
| 5,819,092 A * | 10/1998 | Ferguson et al. | 717/113 |
| 5,958,012 A * | 9/1999 | Battat et al. | 709/224 |
| 6,308,174 B1 * | 10/2001 | Hayball et al. | 707/10 |
| 7,127,743 B1 * | 10/2006 | Khanolkar et al. | 726/23 |
| 7,467,067 B2 | 12/2008 | Marvasti | |
| 7,693,993 B2 * | 4/2010 | Sheets et al. | 709/226 |
| 2002/0165842 A1 * | 11/2002 | Hellerstein et al. | 706/47 |
| 2003/0084146 A1 * | 5/2003 | Schilling et al. | 709/224 |
| 2003/0204579 A1 * | 10/2003 | Lutz | 709/223 |
| 2004/0030450 A1 * | 2/2004 | Solomon | 700/245 |
| 2004/0059966 A1 * | 3/2004 | Chan et al. | 714/48 |
| 2004/0078364 A1 * | 4/2004 | Ripley et al. | 707/3 |
| 2005/0198412 A1 * | 9/2005 | Pedersen et al. | 710/30 |
| 2006/0015597 A1 * | 1/2006 | Scott et al. | 709/223 |

* cited by examiner

*Primary Examiner* — Djenane Bayard
*Assistant Examiner* — Ninos Donabed
(74) *Attorney, Agent, or Firm* — Fernandez & Associates, LLP

(57) ABSTRACT

A system and a method for leveraging human knowledge held by system administrators to support improved or optimal management of an information technology network. The present invention monitors and records the states and values key management indicators related to actions taken by a human system administrator in improving a perceived suboptimal state of the information technology network. The present invention predicts the effect of command in situations later occurring, and optionally suggests actions to a system administrator. The method of the present invention optionally enables embodiments of the present invention to automatically select one or more preferred system commands and execute the selected command or commands.

20 Claims, 10 Drawing Sheets

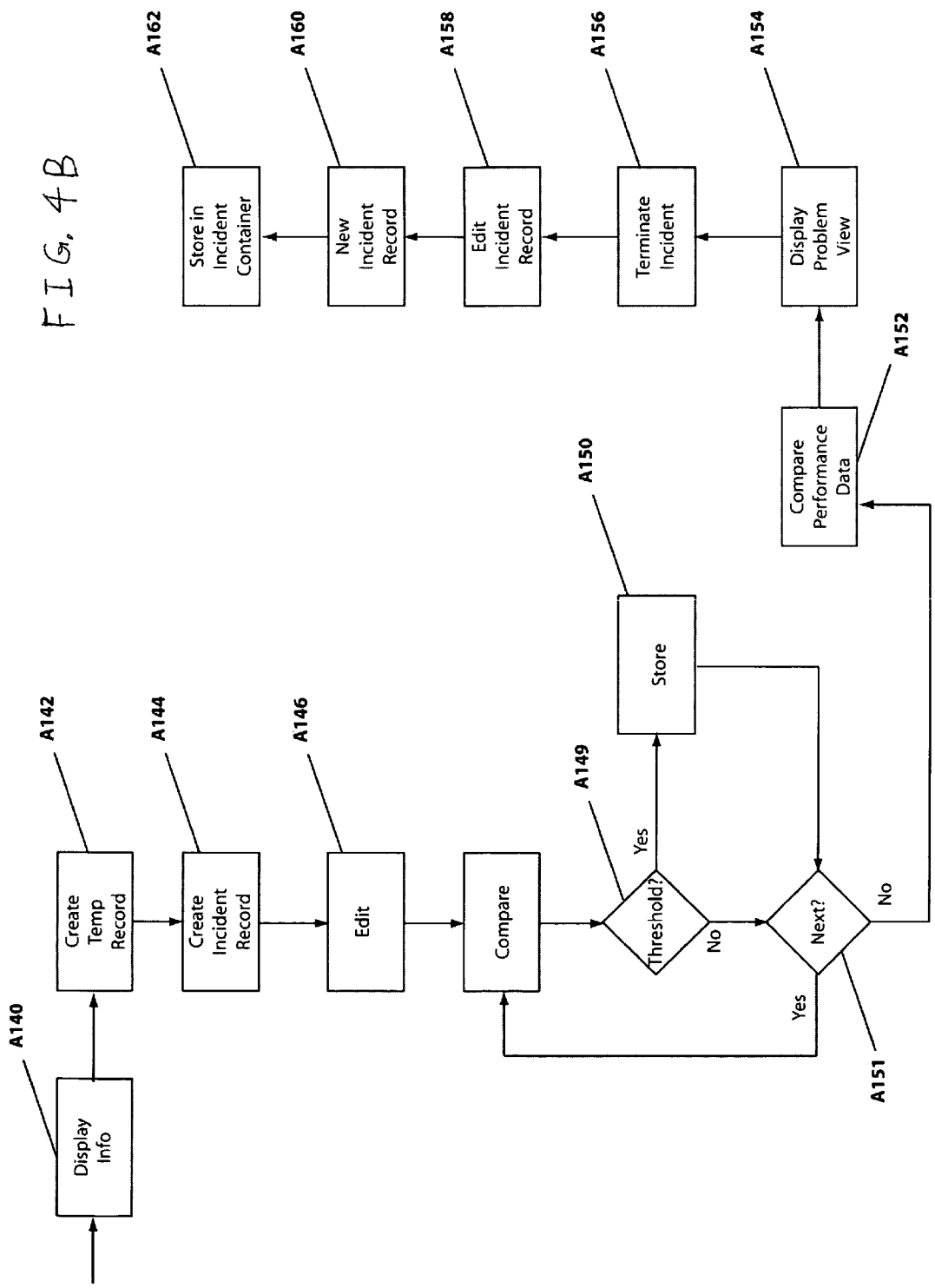

METHOD AND SYSTEM FOR IMPROVED IN-LINE MANAGEMENT OF AN INFORMATION TECHNOLOGY NETWORK

FIELD OF INVENTION

The present invention relates to the application of information technology networks and systems in supporting an activity or a process. More particularly, the present invention relates to systems and techniques for improving system management responses to degradation or interruption of an activity, a process, an information technology network, or an information technology system.

BACKGROUND OF INVENTION

Information technology is applied in many sectors of the economy to improve management of processes having a plurality or multiplicity of measurable parameters. The prior art attempts to provide and implement information technology techniques that enable an information technology network to automatically and aggressively respond to indications of sub-optimal states of a target or monitored process. Some of these prior art techniques attempt to empower an automated management system to enable self-healing of the information technology network, whereby the network learns to alter the operation of the information technology network independently of interaction with a human manager. Certain prior art attempts provide a software program that independently learns to isolate causes of process, equipment, information technology network or system degradation, and generates and executes strategies to return improve the operating state of the target process, network or system. Prior art of this type requires a learning cycle and often fails to adapt at a sufficient speed when applied within in a heterogeneous and morphing environment, wherein the reaction of the targeted process to commands is less related to historical behavior. Furthermore, requiring a software program to predict all possible outcomes typically hobbles prior art automation management as applied to complex processes, as the universe of possible root causes and potentially appropriate responses may increase geometrically or exponentially in relation to the number of measurable or measured parameters associated with a monitored or target process. In addition, as the potential for serious loss caused by a damaging response by a prior art automated management system increases as the criticality of a process increases, the application of prior art self-healing techniques and other automated software driven management of processes, networks and systems are less likely to be applied where improvements in automated system management are most desired.

There is, therefore a long felt need for information technology management solutions that may conform to an existing hierarchy, scale to meet needs of various situations and organizational requirements, provide knowledge beyond status data and event descriptions, manage an information technology network in light of business priorities; and/or diagnose a state or trend of a process, network or system on a basis of information that includes data derived from human empirical review of observed and recent activity of, and date received by the information technology system.

OBJECTS OF THE INVENTION

It is an object of the present invention to provide guidance for use in improving the management of a process, an equipment, an information technology network, or an information technology system.

It is a further optional object of the present invention to provide a system that couples with or is comprised within an information technology network or system and that increases the effectiveness of support staff in responding to interrupted, degraded or sub-optimal network or system performance.

It is an object of certain preferred embodiments of the present invention to provide a method of determining the preferred actions for an information technology network or system manager to take in response to interrupted, degraded or sub-optimal performance of a process, an information technology network, or an information technology system.

It is a further object of certain preferred embodiments of the present invention to provide a method that extracts human knowledge about best or preferable practices in managing an information technology network or system by observing human interaction with the information technology system.

It is another optional object of certain preferred embodiments of the present invention to automate or semi automate responses to performance degradation, sub-optimal behavior, or interruption of an information technology network or system.

It is still another object of certain preferred embodiments of the present invention to provide a method to collect suggestions from human system administrators regarding information technology network or system behavior and management of information technology network or system behavior.

It is an additional object of certain preferred embodiments of the present invention to provide a system that forecasts information technology network or system behavior in response to network or system management actions.

Additional objects and advantages of the present invention will be set forth in the description that follows, and in part will be obvious from the description, or may be learned by practice of the present invention. The objects and advantages of the present invention may be realized and obtained by means of the instrumentalities and combinations particularly pointed out in the appended claims.

SUMMARY OF INVENTION

A method and system are provided for aiding the management of a process or an equipment by an information technology network or system. The process or equipment may be associated with the information technology network or system, or an equipment, process, network or system external to the information technology system. In a first preferred embodiment of the method of the present invention, key performance indicators are monitored, wherein an intervention request is generated when one or more key performance indicators enter into pre-specified ranges, states or values. A value, values, or range of values of one or more performance indicators ("KPI") are identified and associated to define a key management indicator ("KMI"). A set of KMI's is stored within a first preferred embodiment, or First Network, for comparison with certain measurements or evaluations of the states or values of the KPI's. These certain measurements may include substantially current information concerning a process, an equipment, or an information technology network or system. One or more KMI may associated with a record of syslog data, commands, and performance data recorded within an incident record. When the plurality of KPI's includes at least one KPI that presents the states or values substantially similar to the pre-specified state, value, or ranges of values of a KPI associated with at least one KMI, the First Network responds by taking appropriate action, where the action is permitted by the First Network, and the action is the associated with the at least one KMI. The action may include issuing commands to one or more elements of the First Network, where a command may be a request for information. A human system administrator may then be alerted and provided with a record of the queries the network, analyzes the state of the network and the states and values of key management indicators, and information derived from or associated with one or more KMI's. The human system administrator, or sys admin, then issues commands to the information technology network with the intention to restore the process, equipment, or information technology network or system to a preferred state. Data describing or related to the intervention request, the states and values of one or more key management indicators and/or key performance indicators related to the intervention request and actions of the sys admin are recorded as an incident report and stored in an incident container. In certain alternate preferred embodiments of the present invention, the sys admin, or other human analyst or technician, may optionally (1) add data to the incident report and container, (2) tag data stored in the incident report and container, (3) annotate data stored in the incident report and container, and (4) exclude information from inclusion in the incident report and container. The information stored in the incident record and container may be selected by the sys admin for the purpose of creating a high level of relevancy of the data selected for storage, or allowed to be stored, in the incident container. The first preferred embodiment of the method of the present invention enables real-time, in-line capture of knowledge applied by a sys admin in responding to a sub-optimal state of an information technology network.

In certain alternate preferred embodiments of the method of the present invention, one or more alert values or state values of one or more KPI's or KMI's are established. An alert value may be a value at which a sys admin, or a computer system, should be or is alerted that the relevant KPI or KMI has met or exceeded a certain value. As described herein, it is an inventive aspect of certain alternate preferred embodiments of the method of the present invention that the present invention may automatically define, generate and/or apply KPI's and KMI's on the basis of the operational history of the present invention and actions taken by the sys admin in querying and managing the operation of an information technology network. In certain alternate preferred embodiments of the method of the present invention, one or more alert values or state values of one or more KPI's or KMI's are established automatically by an information technology management software program. An alert value may be a value at which a sys admin, or a computer system, should be, or is, alerted that the relevant KPI or KMI has met or exceeded a certain value.

It is understood that the terms "information technology system", "information technology network", and "IT network" are defined herein to include any configuration of two or more computational or electronics devices that are communicatively linked, two include configurations having two or more digital electronics devices that are communicatively linked with a each other and/or a monitor system. The term information technology system is comprised within the definitions of the terms "information technology network" and "IT network".

A second preferred embodiment of the present invention, or Config TWO, comprises a context engine, a precast engine, an automation module, a key management indicator database, and an incident container. Config TWO generates predictions about network responses to possible commands. Config TWO may optionally be enabled to automatically select a preferred command or command sequence and execute the preferred command or command sequence.

BRIEF DESCRIPTION OF DRAWINGS

These, and further features of the invention, may be better understood with reference to the accompanying specification and drawings depicting the preferred embodiment, in which:

FIG. 4A and FIG. 4B are a process flow chart of the creation of an incident record of the first preferred embodiment of FIG. 3;

BRIEF DESCRIPTION OF PREFERRED EMBODIMENTS

The following description is provided to enable any person skilled in the art to make and use the invention and sets forth the best modes contemplated by the inventor of carrying out his or her invention. Various modifications, however, will remain readily apparent to those skilled in the art, since the generic principles of the present invention have been defined herein.

Figure 1:
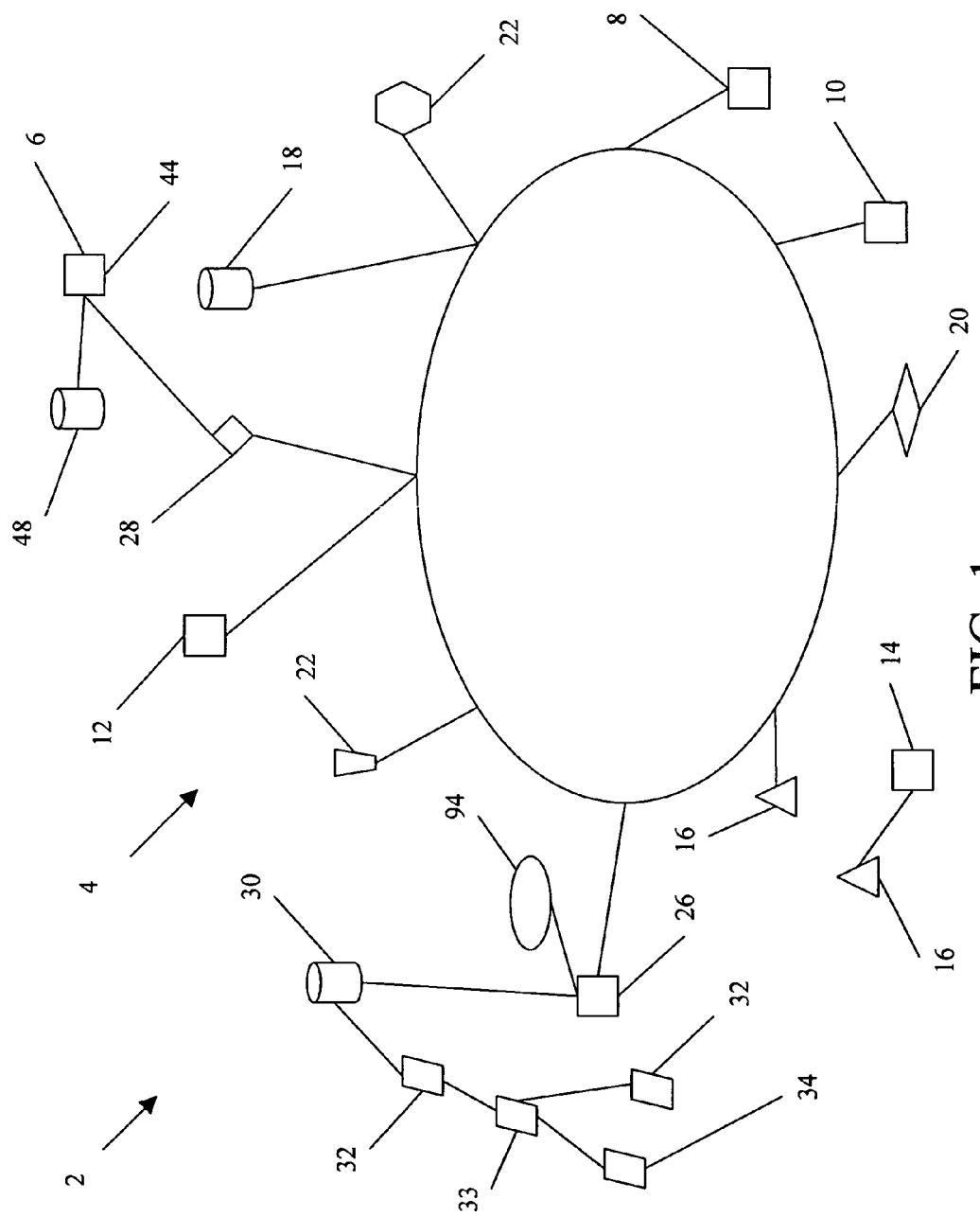
FIG. 1 illustrates an information technology network, or First Network.

Referring now generally to the Figures and particularly to FIG. 1, a first information technology network 2, or First Network 2, includes a communications network 4, and a variety of elements 6, to include computational systems 8, personal computers 10, sensing devices 12, wireless communications devices 14, wireless communications transponders 16, memory modules 18, telephones 20, electronic communications instruments 22, electronic devices 24, and an admin workstation 26. The wireless communications transponders 16 are configured to provide unidirectional or bidirectional communications between the wireless communications devices 14 and the communications network 2. The wireless communications devices 14 may be or comprise computational devices such as personal digital assistants, or telephony systems, such as cellular telephones. An admin workstation 26, and the elements 6, to include the computational systems 8, the personal computers 10, the sensing devices 12, the wireless communications devices 14, the wireless communications transponders 16, the memory modules 18, the telephones 20, the electronic communications instruments 22, and the electronic devices 24 either directly or via an intermediate electronic communications device 28. The communications network 4 may be or comprise the Internet, an intranet, an extranet, a computer network, a telephony network, a wireless telephony network, and/or a wireless communications network.

The admin workstation 26 receives information regarding the conditions and states elements 6 and the processes of the elements 6 and the communications network 4 by monitoring the First Network 2 and by receiving alert messages and status readings from the elements 6. The monitoring by the admin workstation 26 and the transmission of messages and readings to the admin workstation 26 may be event driven, and/or be time scheduled. Requests by the admin workstation 26 for reports of status or condition of one or more elements 6, or of the First Network 2 may trigger communications from one or more elements 6, wherein the communications, scheduled or unscheduled, provide information describing one or more parameters, conditions, or states of one or more processes or elements 6 of the First Network 2. The information provided to the admin workstation 26 may include the values of one or more key performance indicators 29 ("KPI") (as per FIG. 2) of the First Network 2 and/or one or more elements 6.

A system memory 30 of the admin workstation 26 contains an incident report container software program 32, or incident container 32. The incident container 32 stores and makes available an incident library 33 having a plurality of incident records 34 that contain information related to previous incidents of experienced by the First Network 2, or that might be of interest to a sys admin tasked with supporting the operations of the First Network 2.

Figure 2:
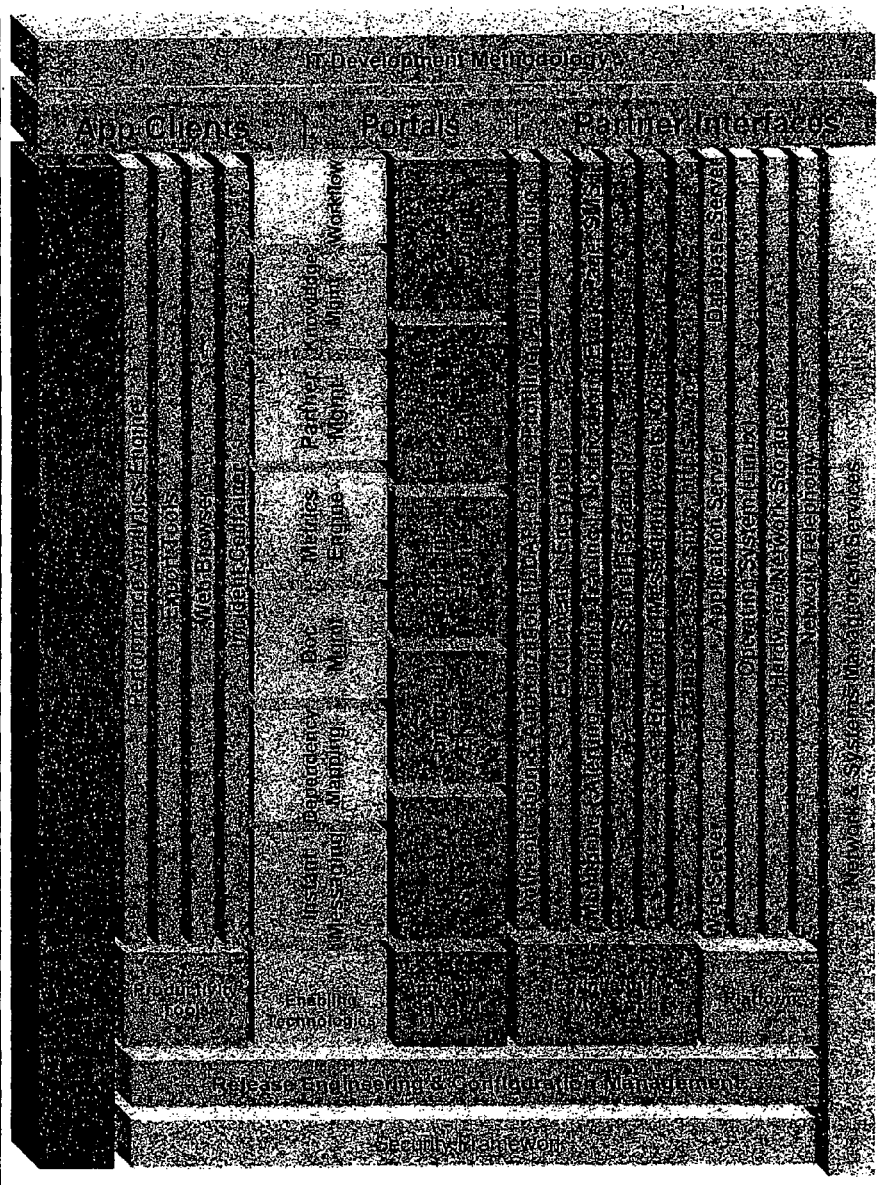
FIG. 2 shows a hierarchy of software modules useful in managing the resources of the information technology network of FIG. 1 and supporting business systems performance.

Referring now generally to the Figures and particularly to FIG. 2, FIG. 2 shows a hierarchy of software modules M2 useful in managing the resources of the First Network 2 of FIG. 1 and supporting business systems performance.

Figure 3:
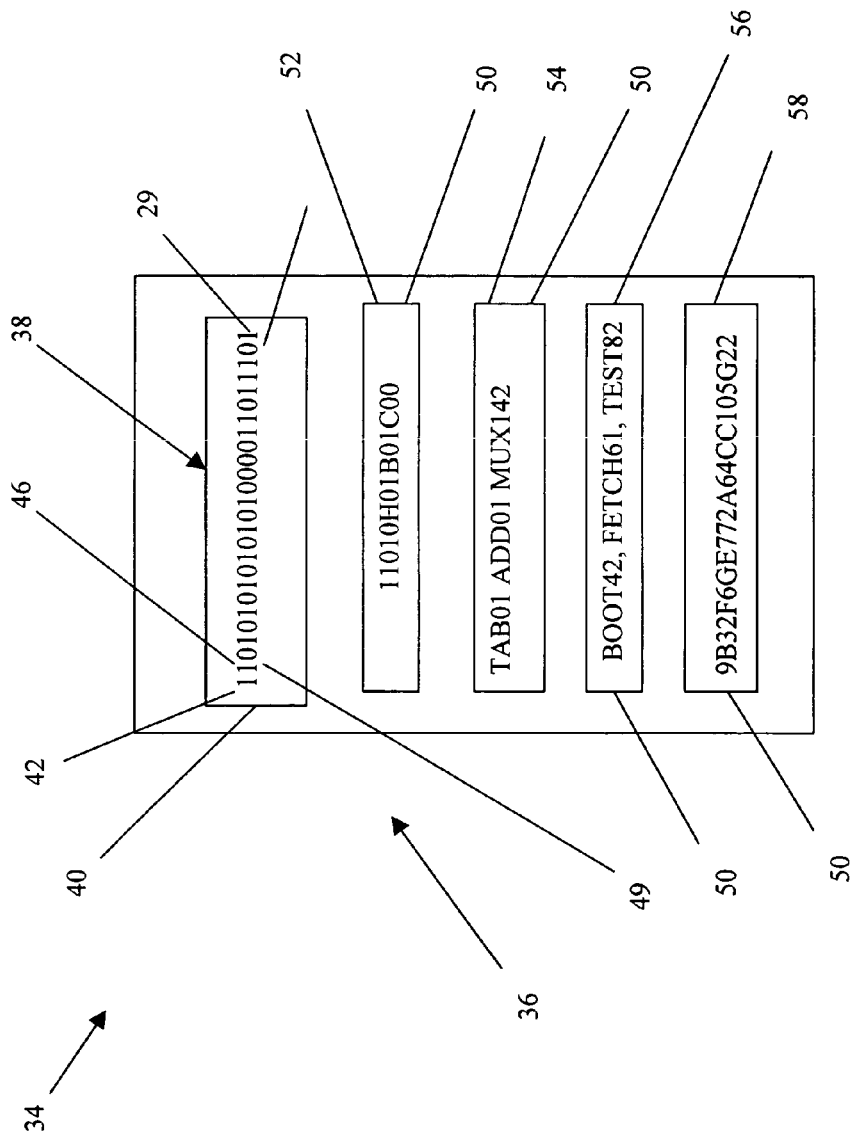
FIG. 3 is a process flow chart of a first preferred embodiment of the method of the present invention that may be implemented by means of the First Network of FIG. 1.

Referring now generally to the Figures and particularly to FIG. 3, the incident record 34 contains information 36 previously captured and stored, wherein the information 36 relates to one or more historical incidents that occurred on the First Network 2 or other IT networks. A Key Management Indicator ("KMI") 38 comprises a Boolean mathematical expression 40, or incident signature 40, that includes values of a plurality KPI's 29 related to the historical incident of the incident record 34. Each KPI 29 is a numerical or logical value that describes the state of a specific KPI 29. Each KMI 38 of each incident record 34 is formatted by placing each KPI 29 in a syntactical order, whereby each of the plurality KMI's 38 can be compared to determine to what degree of similarity each KMI 38 describes the states, conditions and parameters, as expressed by the plurality of KPI's 29, as related to specific historical incidents. It is understood that various preferred embodiments of the method of the present invention may use suitable mathematical techniques known in the art to compare the degree of similarity or dissimilarity between the of values of the plurality of KPI's 29 as recorded separately in particular KMI's 38. These alternate mathematical techniques for comparisons of KMI's 38 may include, in combination or in singularity, the application of Boolean logic expressions and Boolean operations, statistical analyses, logical value comparative techniques, and other suitable logical, mathematical and statistical methods known in the art.

In the preferred embodiment of the method of the present invention as practiced by means of the First Network 2 a plurality of KPI's 29 are defined as describing the state of specific parameters of elements 6, the communications network 4, and processes of the First Network 2. For example the first KPI 42 is a Boolean value that indicates whether a computer system 44, an element 6 of the First Network 2, is operating above or below a given level of loading. A second KPI 46 is a Boolean value that indicates whether a memory module 48 of the computer system 44 is above or below a pre-specified level of free storage space. A third KPI 49 is a Boolean value that indicates whether the communications network 4 is transmitting more or less of a pre-specified volume of electronic message volume. By comparing the first KPI 42, second KPI 46, and third KPI 48, and other pre-defined KPI's 29 that are ordered within each KMI 38 according to an identical syntax, Boolean logic techniques can determine the degree of similarity between any two KMI's 38. It is understood that the certain preferred embodiments of the method of the present invention allow for the condition of "do not care", wherein the degree of similarity between two KMI's 38 is not affected by a KPI 29 that is designated as being irrelevant, i.e., "do not care", to a particular comparison or class of comparisons between or among the KMI's 38. It is also understood that weighted averaging techniques may be applied within certain still alternate preferred embodiments of the method of the present invention, wherein the degree of similarity between two KMI's, as determined by mathematical, computational or logical operations, is affected by assigning greater or lesser significance to one or more KPI's 29. For example, a match between the first KPI's 42 of two individual KMI's 38 may be less relevant to describing the similarity of the two individual KMI's 38 than a match between the third KPI's 48 of the compared KMI's 38. For example, a weighted average technique might assign a fractional value significance to a match between the first KPI's 29 and a double value significance to a match between the third KPI's 29 of the compared KMI's 38.

Referring now generally to the Figures, and particularly to the incident record 34, or incident report 34, of FIG. 2, the incident report 34 comprises five incident aspect sections 50, consisting of (1) the KMI 38 having the incident signature 40, (2) an alarm record 52, (3) a syslog list 54, (4) a plurality of command citations 56, and (5) performance data 58. Each aspect section 50 may contain information related to a same historical incident of the First Network 2. The information contained in each aspect section 50 may have been selected for entry into the incident report 34 by a sys admin and as according to the method of the present invention. It is understood that the term command is defined herein to include requests for information and other queries that may be addressed to or via the First Network 2.

Figure 4A:
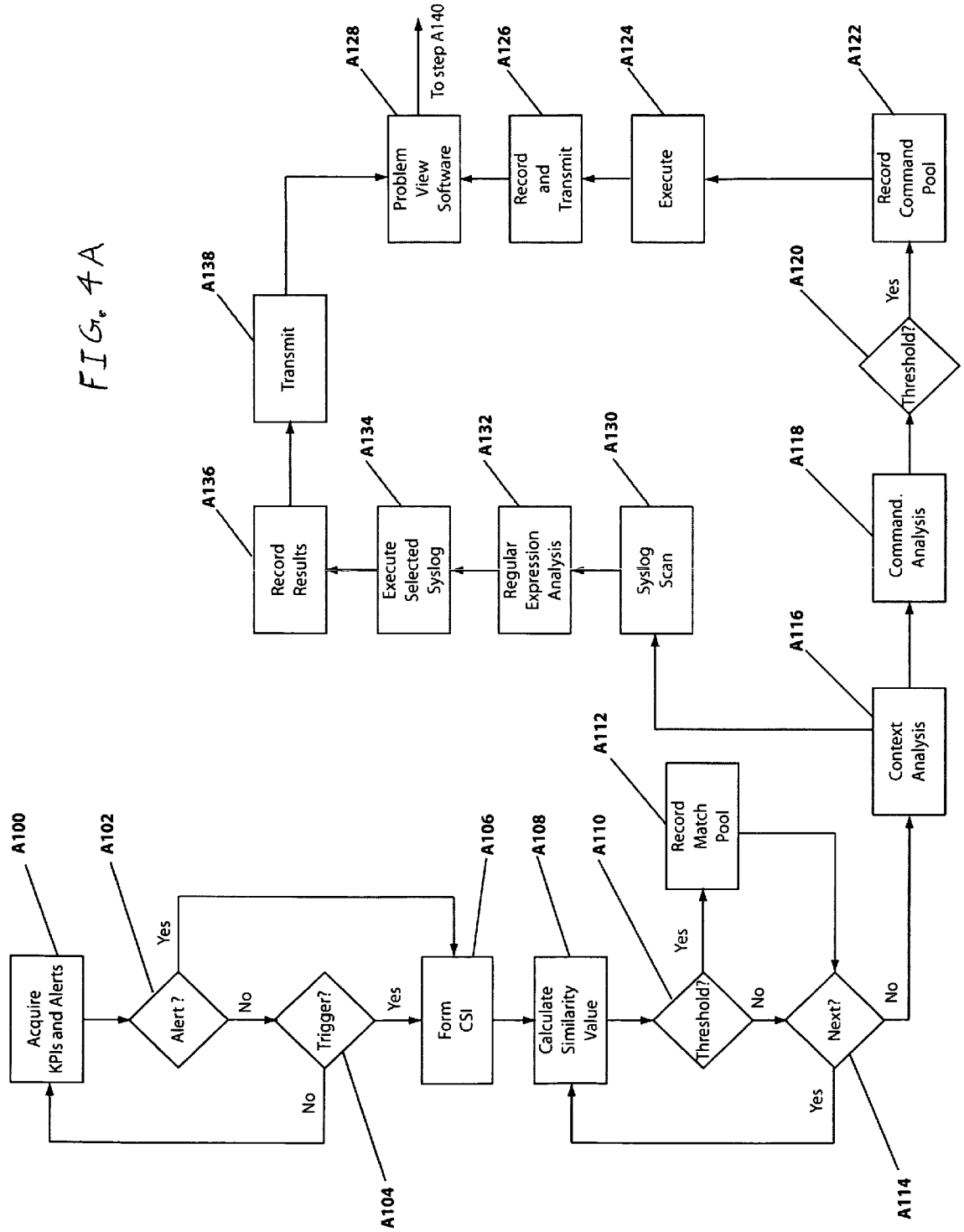

Referring now generally to the Figures and particularly to FIG. 4A and FIG. 4B, FIG. 4A and FIG. 4B comprise a process flow chart of a preferred embodiment of the method of the present invention that may be effected via the First Network 2 by means of an in-line management software program 60, or in-line tool 60. The in-line tool 60 may be stored in the system memory 30 of the admin workstation 26, or the in-line tool 60 may distributively stored in whole or in portions within the First Network 2, the memory modules 18, the system memory 30, and other suitable electronic elements 6 known in the art.

The process flow chart of FIG. 4A and FIG. 4B is driven and managed by the in-line tool 60 in coordination with the First Network 2. In step A100 values of KPI's 29 and alert messages are acquired or received by the admin workstation 26 via the communications 4. In step A102 the in-line tool 60 determines if any alert messages have been acquired or received via the First Network 2. If an alert is not received, the in-line tool 60 moves on to step A104. If an alert message is received or acquired the in-line tool 60 proceeds beyond step A104, as described below, to execute an analysis of the states and condition of the First Network 2 in light of the incident library 33 and as described herein.

In step A104 the in-line tool 60 compares the acquired KPI's 29 to values of a trigger signature 62, whereby if the values of the acquired KPI's 29 present a commonality of a pre-specified degree with the values of the trigger signature 62, the in-line toll 60 proceeds to create a current signature state 64 in step A.106. The current signature state 64 includes a current incident sate 66 ("CIS"), wherein the CIS 66 is formatted according to the syntax of the KMI 38 and contains some or all of current values of the KPI's 29 of the KMI 38. It is understood that the CIS 66 may contain null values of one or more KPI's 29 and/or values of one or more KPI's 29 that are not the most recent available, as external conditions or other causes may limit or affect the capability of the in-line tool 60 to efficiently or timely acquire the most current value of all relevant KPI's 29.

An alternate route to step A106 exists from step A102, wherein the in-line tool 60 jumps from step A102 to step A106 on the occurrence of a positive finding by the in-line tool of an acquired or received alert.

In step A108 the CIS 66 is compared to a first incident record 68 of the incident library 33 and a measure of the degree of similarity 70 of the CIS 66 and the first incident record 68 is computationally generated, optionally using Boolean logic methods, statistical techniques, and/or weighted averaging techniques. In step A110 the measure of the degree of similarity 70 is compared against a similarity threshold value 72. Where the measure of the degree of similarity 70 exceeds the similarity threshold value 72, the first incident record 70, or a pointer to or identifier of the first incident is stored in a match pool 74 in step A112. If the measure of the degree of similarity 70 does not exceed the similarity threshold value 72, the in-line tool 60 proceeds on in step A114 to determine if there is an additional incident record 34 that has not been compared to the CIS 66. The loop from step A.106 to step A.114 is repeated until all of the incident records 34 of the incident library 33 have been compared with the CIS 66, and the incident records 34 that exhibit a pre-specified of the degree of similarity as required by step A108 are all stored, or pointers to or identifiers of the selected incident records 34, in the match pool 74. A current incident is detected and initiated when a single incident record 34 and the CIS 66 meets or exceeds the degree of similarity as tested for in step 108.

Referring now generally to the Figures, and particularly to FIG. 3, FIG. 4A and FIG. 4B, when a current incident is detected, the in-line tool 60 proceeds in step A116 a context analysis engine 76 of the in-line tool 60 accesses the incident records 34 stored in or indicated by the match pool 74 from the match pool 74 and/or the incident library 33. As discussed above, each incident record 34 contains information included in the incident aspect sections 50 of (1) the KMI 38 having the incident signature 40, (2) an alarm record 52, (3) a syslog list 54, (4) a plurality of command citations 56, and (5) performance data 58. Each aspect section 50 may contain information related to a same historical incident of the First Network 2.

A policy rules engine 78, or policy engine 78, is accessed by the context analysis engine 76 whereby the policy engine informs the context analysis engine 76, or context engine 76, of permissions and/or prohibitions that empower or limit actions and commands that the in-line tool 60 may automatically without permission from a sys admin. It is understood that the policy engine 78 may optionally further prohibit certain acts or commands even in the event that the sys admin communicates permission to the in-line tool 60. It is further understood that in certain alternate preferred embodiments of the method of the present invention the context engine 76 may interpret a lack of a prohibition by the policy engine 78 of an act, or a lack of a prohibition by the policy engine 78 of an issuance or execution of a command, as permission to take the non-prohibited act, issue the non-prohibited command, or execute the non-prohibited command. It is further understood that in certain still alternate preferred embodiments of the method of the present invention the context engine 76 may interpret a lack of the policy engine 78 to issue permission to perform an act, or a lack of the policy engine 78 to issue a permission to issue or execute a command, as a prohibition against making the unauthorized act, or issuing the unauthorized command, or executing the unauthorized command.

The context engine 76 collates the syslog lists 54 and the command citations 56 of the incident records 34 for the steps following in the preferred embodiment of the method as described in FIG. 4A and FIG. 4B. In step A118 a command analysis engine 80 determines the frequency of the occurrence of similar or identical commands in each of the incident records 34 delivered to the context engine 76. As indicated in step A120, when the frequency of a particular command, or of a plurality of similar commands, as found within the command citations 56 delivered to the command analysis engine 80, exceeds a pre-established threshold, the precise command or a generalized form of a group of similar commands is transferred into a command pool 82 in step A122. In step A124 the commands from the command pool 82 are automatically executed by a command engine 84, given that the execution of the command is permitted by the policy engine 78. The command engine 84 may be directly informed of permissions and prohibitions of automatically exercising commands either by direct or indirect communication with the policy engine 78, or by instructions sent from the context engine 76 as derived by the context engine 76 in interpreting the prohibitions and policies of the policy engine 78.

In step A126 any or some of the reported or detected results of the commands that were executed in step A124 are recorded. In step A128 a problem view software 86 contains the commands that were provided to the command analysis engine 80, with indications of those commands that passed the threshold execution test of step A120, and with indications of the those commands that were executed in step A124, and the results of the executed commands as stored in step A 126. The commands as stored in the problem view software 86 are thus tagged with (1) indications of similarity with other commands processed by the command engine 84, (2) indication if the command was automatically executed by the in-line tool 60 in step A124, and (3) some or any reported or detected results of the execution of the command as per step A126.

Approximately simultaneously with the execution of steps A118 through A128 that deal with command analysis a series of steps A130 through A136 are processed by the in-line tool 60. In step A130 the syslog lists 54, of the incident reports 34 and as delivered to the context engine 76 in step A116, are scanned and recorded. In step A132 the syslog lists 54 are processed through an automated regular expression analyzer 88. The output of the automated regular expression analyzer 88 is delivered to a log scanner 90 in step A132, wherein the log scanner 90 accesses a current log database 92 for comparison with the output of the regular expression analyzer 88, whereby the information derived from the syslog lists 54 and delivered to the log scanner 90 is tagged where significant or substantive commonality is found between the output of step A132 and the contents of the current log data base. In step A134 a syslog engine 92 executes syslog information tagged in step A132 where the tagged information is actionable, and the potential action is in accordance with the rules of the policy engine 78. In step A136 results detected in associated with execution of syslog information as per step A134 are recorded. In step A138 the tagged syslog information of step A132, the actions of step A134 and the detected results of step A136 are stored in the problem view software 86.

In step A140 some or all of the information delivered to the problem view software 86 is presented to the human sys admin via a display device 94 of the admin workstation 26. The human sys admin is thereby with information by the in-line tool 60 that describes the actions of the in-line tool 60 and information stored in one or more incident reports 34.

In step A142 the in-line tool 60 creates a temporary incident record 96 and records information related steps A 100 through A 140, and the interaction of the human sys admin with the First Network 2. In step A144 the sys admin selects information presented provided by the First Network 2 into a current incident report 98. The sys admin may additionally annotate the current incident report with comments or other information in step A 146.

The in-line tool 60 performs an advanced analysis of the syslog list 54 and the commands citations 56 of the selected KMI's of step A112 in steps A148 through A152. In step A148 the in-line tool 60 compares the information recorded in the temporary incident record 96, the current incident report 98 and/or the problem view software 86 with the selected KMI's 38 stored in the match pool 74 as per step A112. More particularly, in step 148 an advanced measure of the degree of similarity 100 and the information of the KMI's 38 stored in the match are compared optionally using Boolean logic methods, statistical techniques, and/or weighted averaging techniques. In step A148 the advanced measure of the degree of similarity 100 is compared against a similarity threshold value 102. In step A150 some or all of each incident record 34 of the KMI's associated with the advanced measures of the degree of similarity 100 that exceeds the similarity threshold value 102 are stored in a performance match data pool 104. In step 152 the performance data stored in the performance match data pool 104 is compared with performance data of the temporary incident record 96, the current incident report 98 and/or the problem view software 86. It is understood that the performance data of step 152 may be descriptive of the values of states of one or more KPI's 29 as maintained or varied over a period of time. As the comparisons of step A152 may be computationally intensive, the in-line tool 60 is designed to perform the comparisons of step A152 after the potentially less computationally intensive actions of steps A100 through A150 in order to support a timely and efficient provision of information to the sys admin. It is understood that various preferred embodiments of the method of the present invention may use suitable alternate mathematical techniques known in the art to compare the degree of similarity or dissimilarity between the of values of the plurality of KPI's 29 as recorded separately in particular KMI's 38 and the performance data of the temporary incident record 96, the current incident report 98 and/or the problem view software 86. These alternate mathematical techniques for comparisons of step A152 may include, in combination or in singularity, the application of Boolean logic expressions and Boolean operations, statistical analyses, logical value comparative techniques, and other suitable logical, mathematical and statistical methods known in the art.

In step A154 the results of step A152 are communicated to the problem view software 86 and thereby made available to the sys admin via the admin workstation 28. In step A156 the incident is terminated, either by the sys admin or the in-line tool 60. In step A158 the sys admin edits the current incident report 98 by addition of data, removal of data, and/or annotation. A new incident record 106 formatted in accordance with the format of the incident record 34 is generated by the sys admin or automatically by the in-line tool 60 in step A 160, whereby information acquired during or via steps A 100 through A158, and as selected by the sys admin, is recorded. In step A162 the new incident record 106 is stored in the incident container 32 and made available to the in-line tool 60 for steps A108 through A160.

Figure 5:
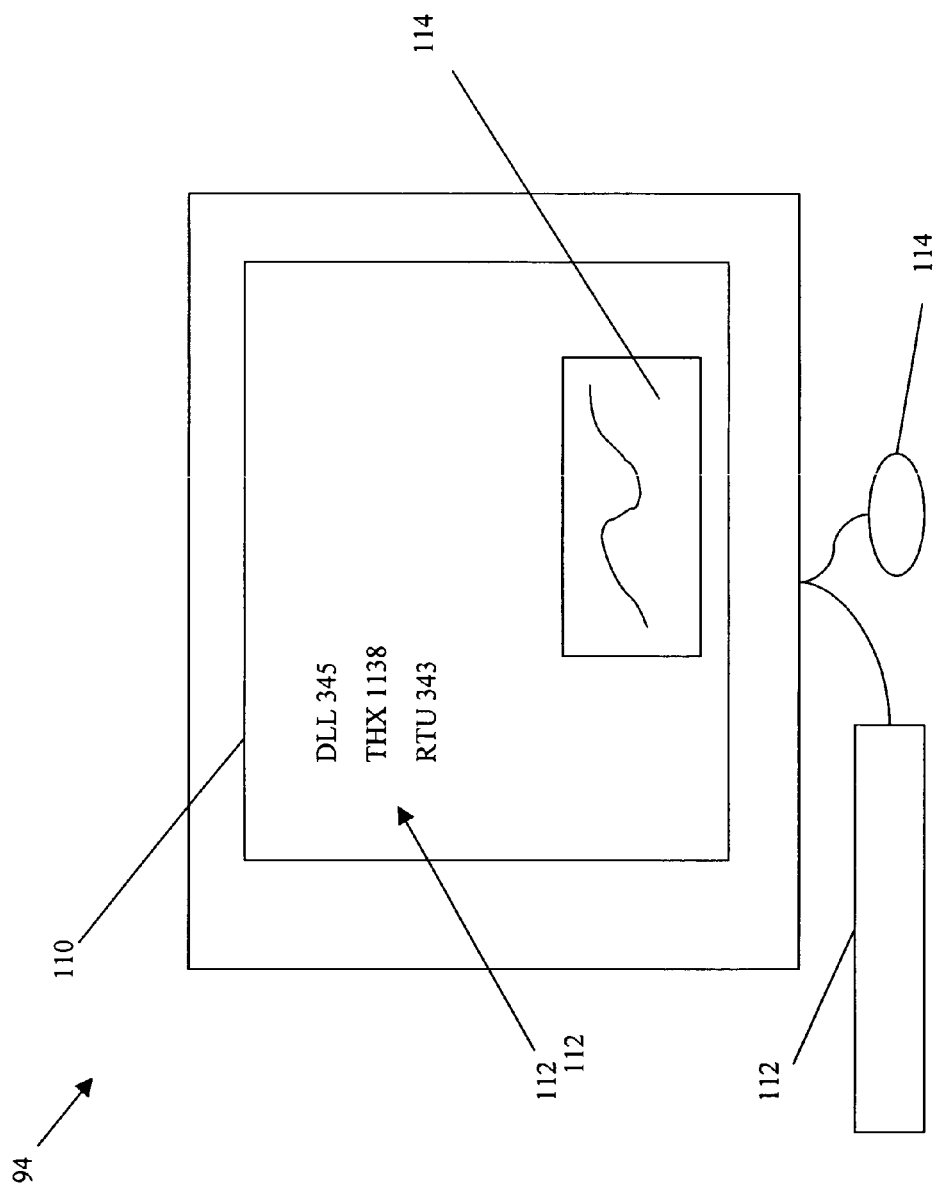
FIG. 5 is a view of a video screen of a display device of a sys admin workstation of the First Network as presented executing the method of the present invention of FIG. 3.

Referring now generally to the Figures and particularly to FIG. 4A, FIG. 4B and FIG. 5, FIG. 5 is a view of a video screen 110 of a display device 94 of the sys admin workstation 26 of the First Network 2 as presented executing the method of the present invention of FIG. 3. The sys admin may select several types of information for recording in the new incident record 106 by indicating and selecting text 112 and images 114 as displayed on the video screen 110. The sys admin may indicate the text 112 and images 114 for selection by using a keyboard 116 and mouse 118 of the sys admin workstation 26. The information displayed on the video screen 110 may originate from several sources, to include the problem view software 86, information stored in the sys admin workstation 26, information received from the communications network 4, and information entered into the workstation 26 by the sys admin.

Figure 6:
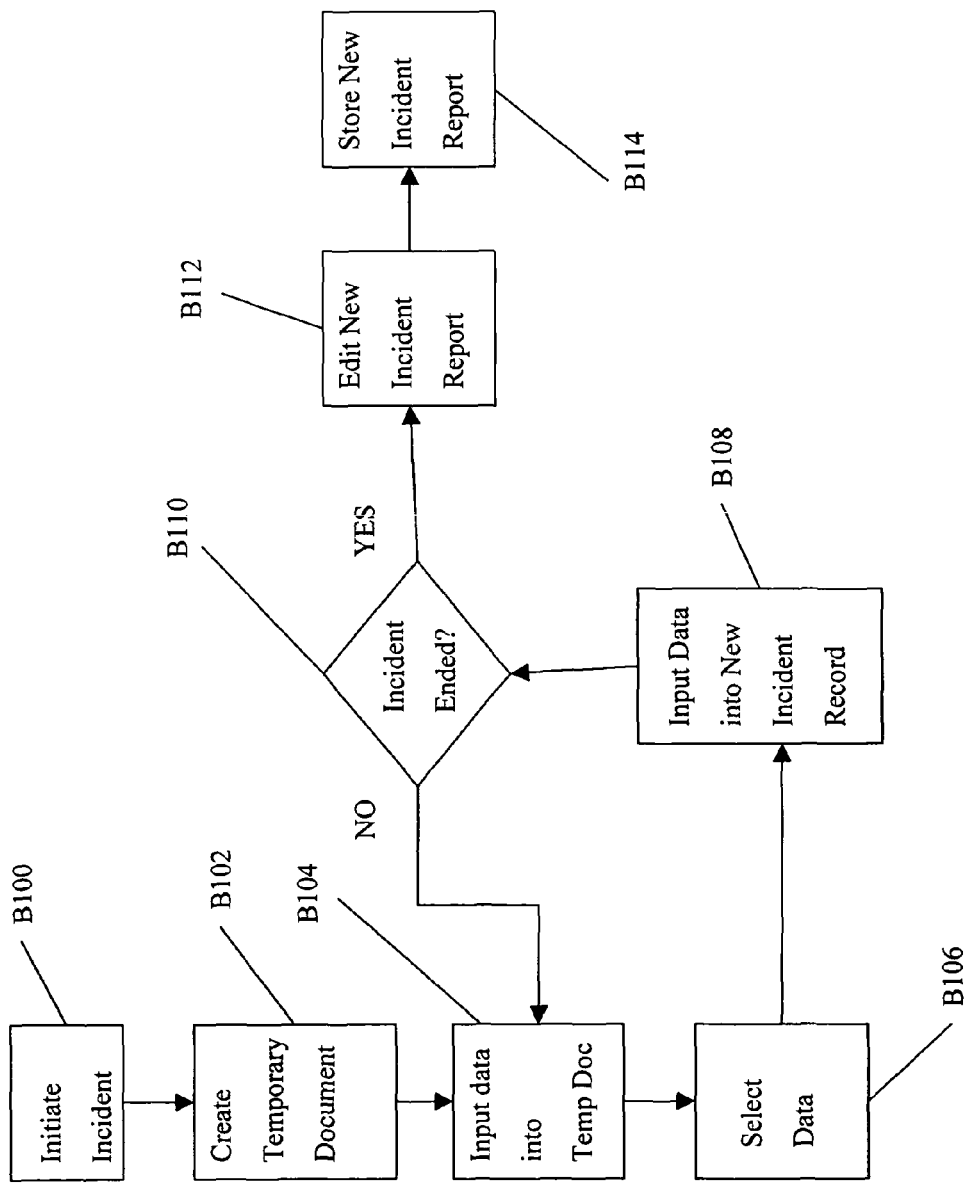
FIG. 6 is a process flow chart of the creation of the new incident record of the in-line tool of FIG. 3.

Referring now generally to the Figures and particularly to FIG. 3 and FIG. 6, FIG. 6 is a process flow chart of the creation of the new incident record 106 of the in-line tool 60 of FIG. 3. In step B100 of FIG. 5 an incident is initiated as per step A106 of FIG. 3. In step B 102 the in-line tool 60 creates the temporary incident record 96, and the new incident report 106. In step B 104 information flows into the temporary incident record 96 from several sources, to include KPI data, information entered into the sys admin workstation 26 by the sys admin, and information sourced from the incident reports 34 of the incident library 33. In step B106 information selected from the temporary incident record 96 is selected by sys admin for storage into the new incident record 106. In step B 108 the sys admin may provide additional information to the new incident record 106 via the sys admin workstation 26 or the communications network 4. In step B110 the in-line tool 60 determines if the current incident has ended. The current incident may be ended automatically by the in-line tool 60 when pre-established criteria are met, or by direction of the sys admin. If the current incident has not ended then the in-line tool proceeds to execute steps B104 through B 110. When the current incident has terminated, the in-line tool then enables the sys admin to edit the current incident record 106 in step B 112. After the step B112 the in-line tool 60 stores the current incident record 106 as an incident report 34 in the incident library 33, as per step B114.

Figure 7:
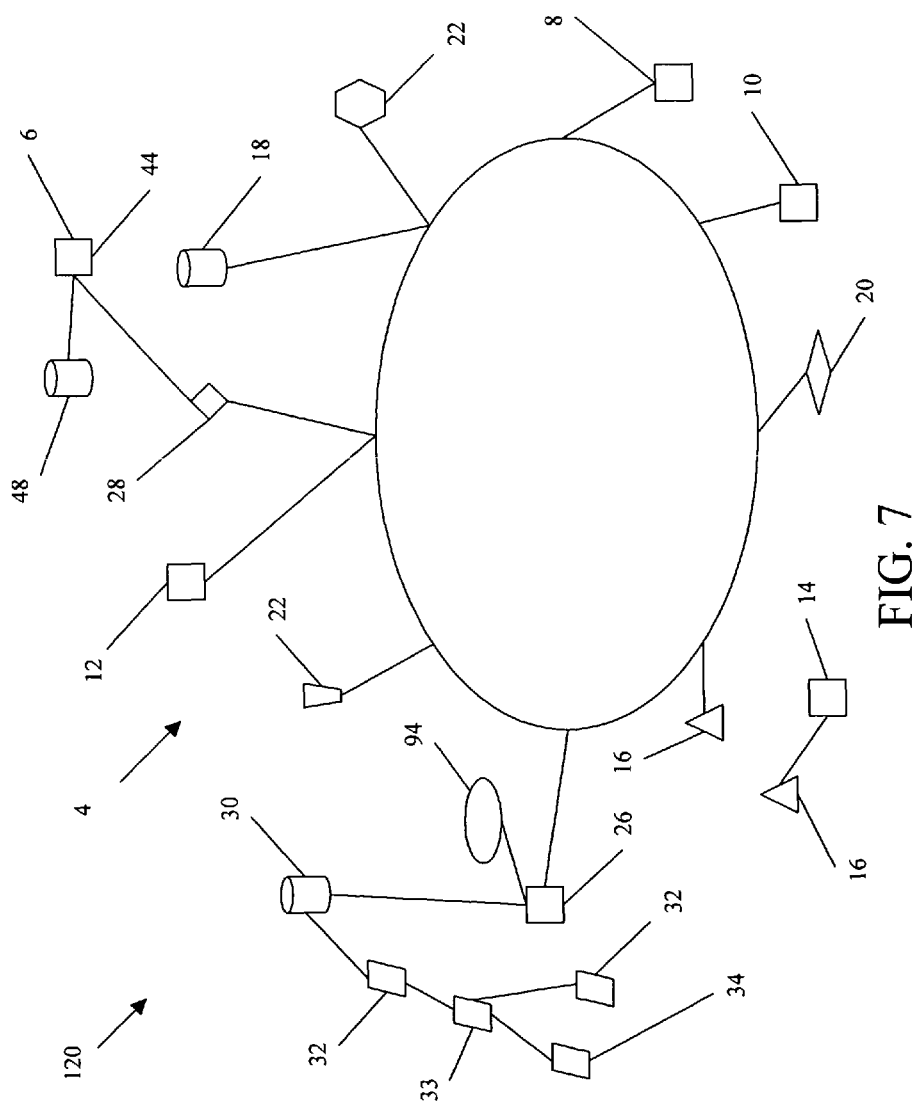
FIG. 7 is a schematic diagram of a second preferred embodiment of the present invention, or Config TWO.

Referring now generally to the Figures and particularly to FIG. 7, FIG. 7 is a schematic diagram of a second preferred embodiment of the present invention, or Config TWO 120. Config TWO 120 includes the communications network 4, and a variety of elements 6, to include computational systems 8, personal computers 10, sensing devices 12, wireless communications devices 14, wireless communications transponders 16, memory modules 18, telephones 20, electronic communications instruments 22, and electronic devices 24. The communications network 4 may be or comprise the Internet, an intranet, an extranet, a computer network, a telephony network, a wireless telephony network, and/or a wireless communications network. The plurality of sensing devices 12 are configured within a manufacturing operation and provide the admin workstation 26 with information about the status of equipment, processes and environment of the manufacturing operation.

The admin workstation 26 receives information regarding the conditions and states elements 6 and the processes of the elements 6 and the communications network 4 by monitoring the communications network 4 and by receiving alert messages and status readings from the elements 6. The monitoring by the admin workstation 26 and the transmission of messages and readings to the admin workstation 26 may be event driven, and/or be time scheduled. Requests by the admin workstation 26 for reports of status or condition of one or more elements 6, or of the communications network 5 may trigger communications from one or more elements 6, wherein the communications, scheduled or unscheduled, provide information describing one or more parameters, conditions, or states of one or more processes or elements 6 of the manufacturing operation. The information provided to the admin workstation 26 may include the values of one or more key performance indicators 29 ("KPI") (as per FIG. 2) of the Config TWO 120 and/or one or more elements 6.

The system memory 30 of the admin workstation 26 contains the incident container 32. The incident container 32 stores and makes available the incident library 33 having a plurality of incident records 34 that contain information related to previous incidents of experienced by the Config TWO 120, or that might be of interest to a sys admin tasked with supporting the operations of the manufacturing operation.

Figure 8:
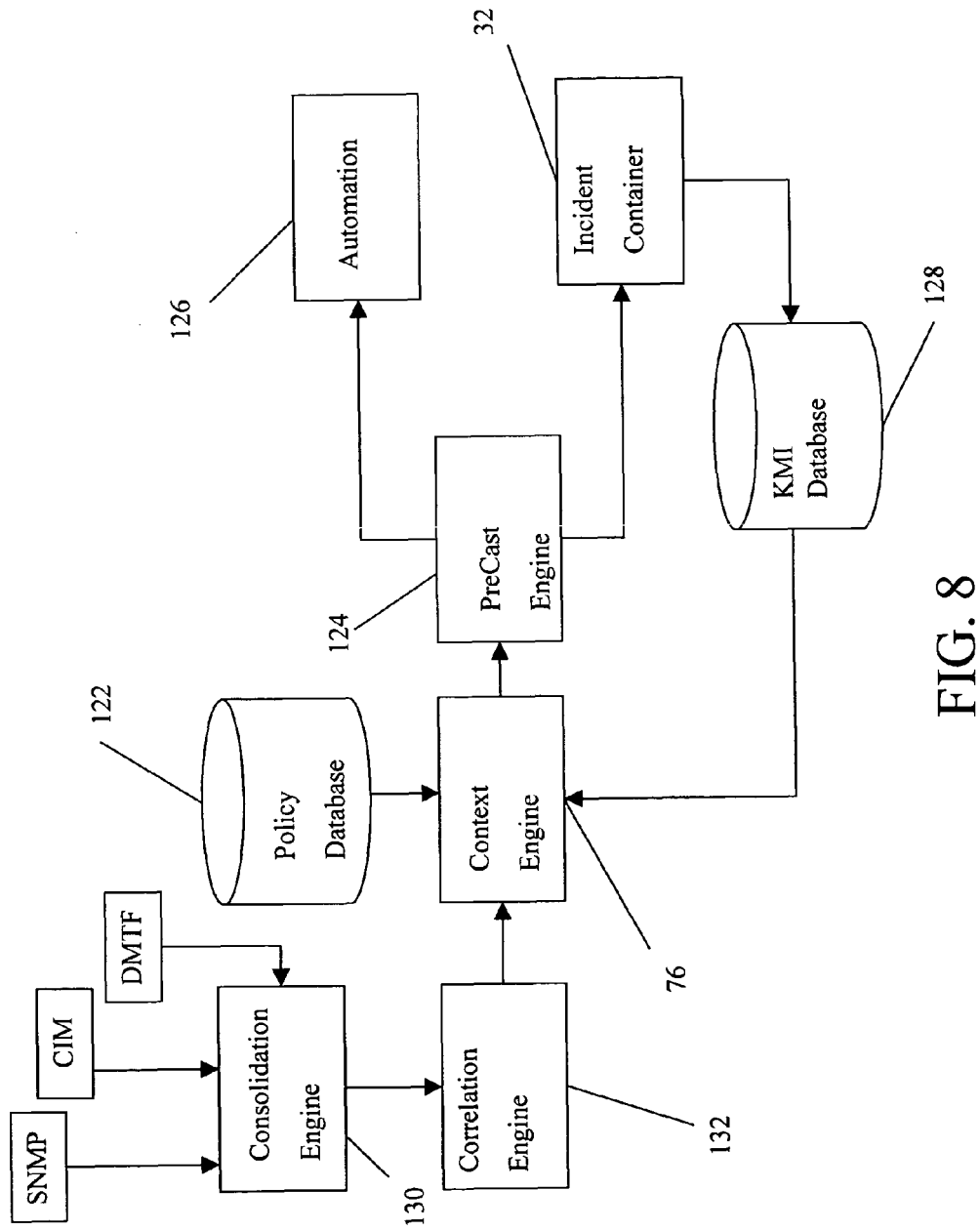
FIG. 8 is a flow chart of the operation of Config TWO of FIG. 7.

Referring now generally to the Figures and particularly to FIG. 4A, FIG. 4B, FIG. 7 and FIG. 8, FIG. 8 is a process flow chart of the operation of Config TWO 120 of FIG. 7. It is understood that Config TWO 120 integrates the process steps of FIG. 4A and FIG. 4B with the steps of the process flow chart of FIG. 8. FIG. 8 illustrates steps taken by the in-line tool 60 in providing data to the context engine 76 from (1) the incident library 33 and (2) information from a policy database 122 in order to determine what actions may be automatically taken by the in-line tool 60. The policy rules engine 76 may be comprised within the policy database 122. A precast module 124 informs an automation engine 126 of commands that are to be executed, as well as providing information to the incident library 33 concerning the current incident. The automation engine 126 executes command as directed by the precast module 124. The incident library 33 stores the new incident report 34 in a KMI library 128 for later access by the context engine 76.

The pre-cast module 124 includes set of algorithms that analyze key performance indicators to provide context and actions. The output of the pre-cast module 124 comprises a set of execution instructions that interact with hardware, software or the end-user to correct a problem of the First Network 2 or obtain additional Key Performance Indicators. A first set of instructions is a prediction of automated actions to correct an identified problem, and commands that interact with the hardware and software infrastructure of the First Network 2. A second set of instructions is a prediction of the types of information to be collected of an environment base on historical interaction between the sys admin and the First Network 2 during troubleshooting. This environment base on historical interaction may include records of interrogation of hardware and software for additional diagnostic information by the sys admin and/or the in-line tool.

A consolidation engine 130 includes a series of software information handlers or programs that normalize information from disparate systems into an XML format that can be easily imported into the system. A correlation engine 132 comprises a software program that ties together KPI information delivered by the consolidation engine 130 with an infrastructure inventory of the First Network 2. The infrastructure inventory can be or include a base model or list of equipment identifications (e.g., specific workstation identifiers), Internet Protocol addresses, time parameters, and other suitable aspects, features or characteristics of a communications network known in the art.

Figure 9:
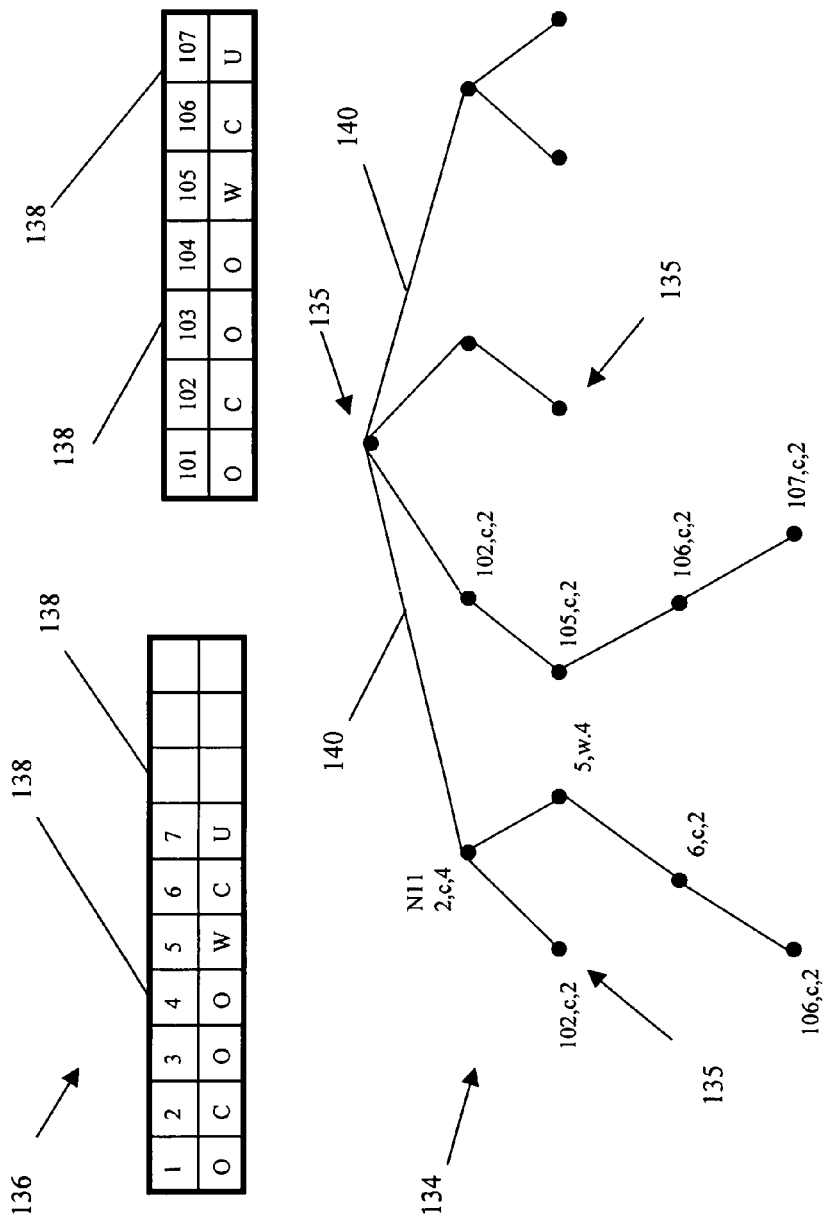
FIG. 9 is a schematic diagram of a decision tree useful in relating a current incident state of FIG. 5 to a library of incident records of FIG. 5.

Referring now generally to the Figures and particularly to FIG. 9, FIG. 9 is a schematic diagram of a decision tree 134 useful in relating the current incident state 66 of FIG. 5 to the library 33 of incident records 34 of FIG. 5. The decision tree 134 includes a plurality of decision nodes 135 and may be used by certain alternate preferred embodiments of the present invention to select incident records 34 that are correlated to a greater or lesser degree with the information contained in the CIS 66. As represented in FIG. 9, a particular set of KPI's of an instant CIS 136 is formatted in Cells 138 ordered in a syntax from Cell 1 to Cell 107. The decision tree 134 is implemented to select incident records 34 that present similar or equal values of individual selected Cells 138. For example, a decision node N11 compares the instant CIS 136 for matching with the plurality of the incident records 34 of the library 33, wherein the determination of a match of an individual incident record 34 with the instant CIS 136 is based upon the existence of a value of "C" in the Cell 2 of the CIS 136 and in the Cell 2 each of the incident records 34. Following the hierarchy of the decision tree 134 a decision node N21 compares a value of the Cell 102 of the instant CIS 136 with the library of incident records 33 to identify a subset of the records 34 that each have a matching value of "C" in the Cell 102. It is understood that the hierarchy of decision nodes may present an order in which values of individual Cells 138 of the instant CIS 136 and each, or subset of, the incident records 34 of the incident library 33 or compared to determine matches with the instant CIS 136 and each incident record 34.

Additionally or alternatively, and as is well known in the art, the decision tree 134 typically may be represented using a plurality of decision nodes 135, each decision node 135 incorporating a test criterion, and the decision tree 134 being organized into a plurality of paths or branches 140. The branches 140 may be are selectively traversed for the instant CIS 136 based upon the application of the attributes, e.g., KPI's, of the instant CIS 136 to the test criteria defined within the decision tree 134. In the decision tree 134, the decision nodes 135 may represent the termination points of paths 140 through the decision tree 134. A decision node 135 may be associated by the in-line tool 160 with identifiers (e.g., pointers or record ID's) of the incident records 34 that best meet the test criteria for a particular instant CIS 136. It is then with these incident records 34 that nearest-neighbor matching is performed to attempt to predict an outcome of, or suggest appropriate responses to, the CIS 136 based upon the outcomes and histories of the incident records 34 of the subset the incident records 34 of the incident library 33 identified by the decision tree 134.

Consistent with certain alternate preferred embodiments of the present invention, each decision node 135 within a decision tree path 140 may be associated with a particular search criterion, e.g., a structured query language or other form of database query that will retrieve the case identifiers that satisfy each test and answer combination. Thus, at each decision node 135, a set of case identifiers that meet the test criterion for that node are dynamically generated. Then, using set intersection, the cases that meet all of the criteria in a path may be dynamically selected.

As an added benefit, in some embodiments, dynamically generating a subset permits a only a portion of a path in a decision tree to be used, e.g., until a candidate case set is small enough to perform efficient nearest-neighbor matching. A result set of matching cases may be dynamically "pared down" from the entire search space at each decision node 135 in a path 140, until a moderate number of cases remain in the result set, whereby an effectively variable-length decision tree paths are defined. As an additional benefit, in many instances, the decision tree need 134 not be modified each time a new case is added to the incident library 33. Such an advantage can be realized based upon the fact that generalizations often do not need to be completely in synchronization with the most current data in a case library 33 to be useful.

In certain still alternate preferred embodiments of the method of the present invention the incident records 33 selected by means of the decision tree 134 and for consideration by the in-line tool 160 in determining the recommended actions are communicated to the sys admin, and/or provided to the automation engine for automatic execution. As one optional feature of certain yet alternate embodiments of the method of the present invention, the set of incident records 33 selected by the decision tree 134 as matching the instant CIS 136 may be selected on variable degrees of matching. For example, a high degree of matching may require that only those incident records 34 that match values of each and every Cell 138 of the instant CIS 136 compared in execution of the decision tree 134 are selected for processing by the in-line tool 160. Alternatively, the degree of matching may be set that those incident records that match values of only 75% of the Cells 138 of the instant CIS 136 compared in execution of the decision tree 134 are selected for processing by the in-line tool 160. The degree of matching may be optionally be set by the sys admin or by a directive of the policy engine, or by the organization of the decision tree 134 itself. As one example of varying the degree of matching required to select an incident record 34 for examination by the in-line tool 160, consider that if a match is found between the values of the instant CIS 136 and an incident record 34 of a particular and pre-identified Cell 138, then the degree of matching required may be raised or lowered, in recognition of the degree of significance of the match of the value of the particular and pre-identified Cell 138.

Many features have been listed with particular configurations, options, and embodiments. Any one or more of the features described may be added to or combined with any of the other embodiments or other standard devices to create alternate combinations and embodiments. The features of one of the functions may also be used with other functions. For example, a scaled measurement could be converted to a nominal value such as a wire gauge.

Although the examples given include many specificities, they are intended as illustrative of only one possible embodiment of the invention. Other embodiments and modifications will, no doubt, occur to those skilled in the art. Thus, the examples given should only be interpreted as illustrations of some of the preferred embodiments of the invention, and the full scope of the invention should be determined by the appended claims and their legal equivalents.

We claim:

1. A method for managing a network of computer devices comprising the steps of:
   a. receiving a plurality of status messages from the network, wherein a status message includes a key performance indicator, wherein the key performance indicator is a variable, numerical value that correlates to a parameter of the network state, wherein said numerical value is descriptive of the network state;
   b. forming a current incident state when a status message indicates a problem with the network, wherein the current incident state contains a key management indicator that is a plurality of key performance indicators arranged according to a syntax;
   c. accessing an incident report from a library of previous incident reports, wherein an incident report stores information associated with an incident of the network, and wherein the information includes a key management indicator and a network action associated with the incident of the network, wherein said incident report further comprises automatically observed human initiated network action associated with the incident;
   d. calculating a similarity value based on a comparison of a key management indicator from the incident report from the library of previous incident reports to the key management indicator of the current incident state;
   e. identifying a similar incident report when the similarity value satisfies a similarity threshold requirement;
   f. selecting a network action from the similar incident report, wherein said network action is provided to an Automation Engine for automatic execution;
   g. executing the selected network action;
   h. compiling information of the current incident state and information of the selected network action into a current incident report;
   i. storing the current incident report in the library of previous incident reports;
   wherein step (d) calculating a similarity value and step (e) identifying a similar incident report comprise traversing a decision tree;
      testing key performance indicators of the current incident state at decision nodes of the decision tree; and
      identifying an incident report from the library of previous incident reports that satisfies a set degree of matching compared in execution of the decision tree, wherein said set degree of matching is variable;
      wherein step (d) includes comparing the key performance indicators of two key management indicators with a Boolean operator.

2. The method of claim 1, wherein the numerical value of the key performance indicator is a Boolean value.

3. The method of claim 2, wherein the status messages further includes error reports from a computer device of the network.

4. The method of claim 3, wherein step (d) includes comparing a plurality of key performance indicators from the plurality of status messages to a trigger signature.

5. The method of claim 1, wherein step (g) automatically executing a network action.

6. The method of claim 5, further comprising the steps of:
   j. presenting information of the current incident state and information of the common network action to a system administrator;
   k. receiving edits to the current incident report from the system administrator; and
      wherein step (i) stores the edited incident report in the library of previous incident reports.

7. The method of claim 6, wherein steps (j) and (k) are performed prior to step (i).

8. The method of claim 6, wherein step (k) includes an action selected from the list: adding information to the current incident report, modifying information of the current incident report, and removing information from the current incident report.

9. The method of claim 8, wherein an incident report additionally stores information related to performance data of the incident; and the method further comprises: calculating a measure of the degree of similarity of the current incident report compared to the key performance indicators of the similar incident reports; and comparing performance data of the current incident report to performance data of an incident report from the library of previous incident reports.

10. The method of claim 6, wherein the common network action is selected from the list: modifying a computer device, requesting more information from the network, and executing syslog information.

11. The method of claim 5, wherein step (d) is performed for at least a subset of the previous reports.

12. The method of claim 11, wherein step (e) includes identifying a plurality of similar incident reports.

13. The method of claim 12, wherein the selected network action further satisfies a second threshold that is based on the frequency of occurrence in a plurality of similar incident reports.

14. The method of claim 12, wherein an incident report additionally stores information related to a plurality of command citations; and wherein the steps (f), (g), and (h) further include performing command analysis that includes the steps:
   calculating the frequency of commands from the command citations;
   selecting a command that satisfies a command frequency threshold;
   executing the selected command when the identified command is allowed to be automatically executed;
   recording network results of the executed command; and
   compiling information related to the selected command in the current incident report.

15. The method of claim 14, wherein the compiled information related to the selected command includes the selected command, the executed command, and the network results of the executed command.

16. The method of claim 15, wherein the network results of the executed command is stored as a new key management indicator, wherein the key management indicator includes a plurality of key performance indicators from after the executed commands.

17. The method of claim 12, wherein an incident report additionally stores information related to a syslog list; and wherein the steps (f), (g), and (h) further include performing a syslog analysis that includes the steps:
   a. processing the syslog list of the similar incident report with a regular expression analyzer;
   b. tagging syslog information where the output of the regular expression analyzer and a current syslog database share substantial similarity;
   c. executing tagged syslog information;
   d. recording results of the executed syslog information; and
   e. compiling information related to the syslog information in the current incident report.

18. The method of claim 12, wherein an incident report stores information related to an alarm record, a syslog list, a plurality of command citations, and performance data.

19. The method of claim 12, wherein a plurality of network actions is selected, executed, and compiled, and wherein the plurality of network actions is composed of different types of network actions.

20. The method of claim 19, wherein the analysis of two different types of network actions from the plurality of network actions are performed substantially simultaneously.

* * * * *